United States Patent
Unland et al.

[11] Patent Number: 5,771,862
[45] Date of Patent: Jun. 30, 1998

[54] KNOCK CONTROL PROCESS FOR AN INTERNAL COMBUSTION ENGINE

[75] Inventors: Stefan Unland, Vaihingen/Enz; Oskar Torno, Schwieberdingen; Werner Haeming, Neudenau; Iwan Surjadi, Vaihingen, all of Germany; Robert Sloboda, Yokohama, Japan; Michael Baeuerle, Markgroeningen, Germany

[73] Assignee: Robert Bosch GmbH, Stuttgart, Germany

[21] Appl. No.: 836,379
[22] PCT Filed: Jun. 25, 1996
[86] PCT No.: PCT/DE96/01375
  § 371 Date: May 2, 1997
  § 102(e) Date: May 2, 1997
[87] PCT Pub. No.: WO97/09530
  PCT Pub. Date: Mar. 13, 1997

[30] Foreign Application Priority Data

Sep. 2, 1995 [DE] Germany .................. 195 32 504.4

[51] Int. Cl.⁶ ........................................... F02P 5/14
[52] U.S. Cl. ............................................ 123/425
[58] Field of Search ........................ 123/425, 435; 364/431.08

[56] References Cited

U.S. PATENT DOCUMENTS

| 5,531,201 | 7/1996 | Boverie et al. | 123/425 |
| 5,560,337 | 10/1996 | Bolander et al. | 123/425 |
| 5,598,822 | 2/1997 | Fujishita et al. | 123/425 |
| 5,608,633 | 3/1997 | Okada et al. | 364/431.08 |

FOREIGN PATENT DOCUMENTS 40 08 170   9/1991   Germany .................. 123/425

*Primary Examiner*—Raymond A. Nelli
*Attorney, Agent, or Firm*—Kenyon & Kenyon

[57] ABSTRACT

A process for adaptive knock control for an internal combustion engine serves to retard the firing angle of an internal combustion engine when knocking occurs and then to advance the firing angle again. At the same time, the operation of the internal combustion engine is subdivided into various operating ranges; on leaving an operating range, a value is always saved as a retardation of the firing angle determined during operation in this range, and when starting up again in this range with load dynamics and/or speed dynamics also occurring at the same time, this saved value is output as the starting value for operation in this new operating range.

6 Claims, 2 Drawing Sheets

KNOCK CONTROL PROCESS FOR AN INTERNAL COMBUSTION ENGINE

BACKGROUND INFORMATION

A knock control process is described in German Patent No. 40 08 170, where the firing angle is adjusted by using an engine characteristics map based on the operating parameters detected, and when knocking occurs, the firing angle is retarded to prevent knocking. Then the retarded firing angle is adjusted back to the mapped firing angle by advancing it incrementally. With this known knock control method, the operating range of an internal combustion engine is subdivided into various ranges. On leaving an operating range during operation of the internal combustion engine, the instantaneous firing angle is saved, and when the internal combustion engine is operated in this range again, the saved firing angle is output as the starting value.

SUMMARY OF THE INVENTION

The process according to the present invention has the advantage, in comparison with the known process, that it prevents sudden changes in firing angle. Therefore, there are no sudden changes in engine torque either, so driving comfort is improved.

It is advantageous to retain the firing angle from the preceding operating range that was the prevailing firing angle when leaving this operating range for operation in the new operating range if the load and/or speed dynamics when changing ranges do not exceed a predefined value; the value that can be predefined is determined for the various operating conditions in the application and is saved in a memory. In addition, it is advantageous to calculate a representative value for the firing angles that have occurred in the previous operation of the internal combustion engine in this range and to use this value as the starting value for the firing angle for operation of the internal combustion engine after changing ranges. Ultimately, the engine characteristics map in the microprocessor can be continuously updated on the basis of operating parameters for output of the firing angle so the knock limit is constantly being learned by the microprocessor. This can be accomplished, for example, by having the last firing angle before occurrence of knocking entered in the engine characteristics map as the new firing angle for this operating point. Another possibility is for the first firing angle after knocking occurs to be entered in the engine characteristics map. It is also conceivable to apply a small correction such as a definable firing angle displacement $\Delta ZW$ to the firing angle before knocking occurs and then enter this value in the engine characteristics map. Moreover, it is also possible for this correction of the mapped firing angle to be implemented only if the firing angle saved in the engine characteristics map differs from the new firing angle to be entered in the engine characteristics map by a predetermined difference DZW. This has the advantage that it ensures operation of the internal combustion engine as close to the knock limit as possible.

DETAILED DESCRIPTION

Figure 1:
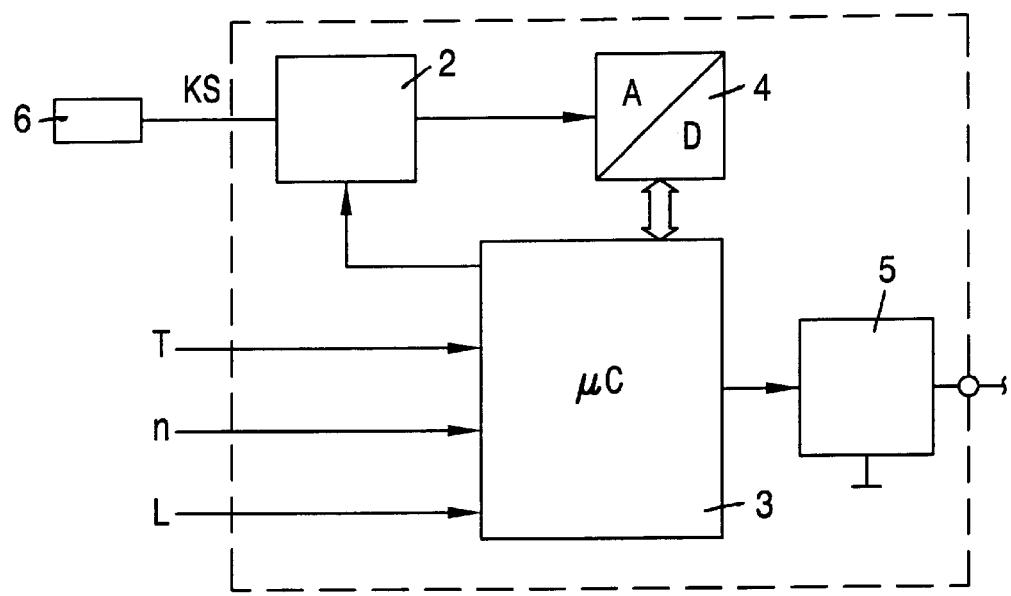
FIG. 1 show a schematic diagram for an adaptive knock control process.
Figure 2:
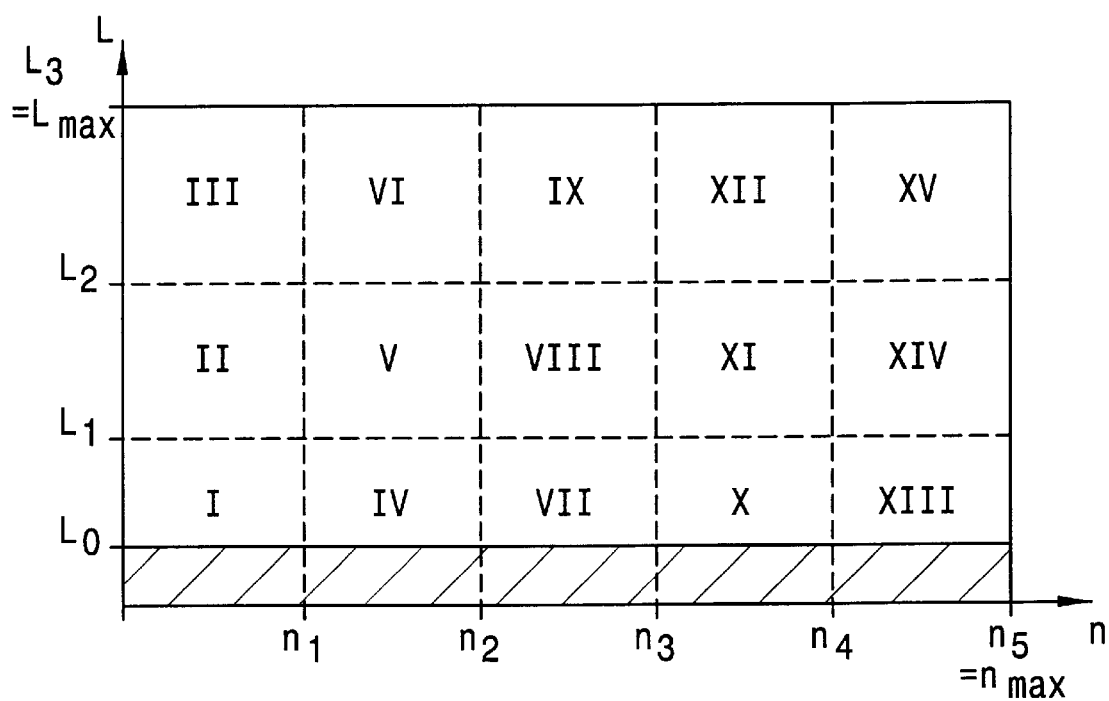
FIG. 2 an adaptive engine characteristics map.

FIG. 1 shows a block schematic for carrying out the process of adaptive knock control. The internal combustion engine (not shown) is operated with a controller 1 that has a knock sensor analysis circuit 2, a microprocessor 3, an analog-digital converter 4 and a firing output stage 5. One or more knock sensors 6 are provided on the engine block of the internal combustion engine and are connected to the knock sensor analysis circuit 2. Knock sensor analysis circuit 2 is connected to microprocessor 3 via analog-digital converter 4. The measured parameters of the internal combustion engine are also sent to microprocessor 3. Thus, for example, the load L, which is determined from the throttle valve angle setting and/or the intake manifold pressure, the speed n and temperature T are sent to the microprocessor. Signal KS representing the engine noise is detected by the knock sensor and sent to knock sensor analysis circuit 2. By comparison with a reference value, this analysis circuit 2 determines whether knocking K has occurred. When knocking occurs, the firing angle output by the microprocessor on the basis of the engine characteristics map is retarded and then subsequently the firing angle is advanced again, which corresponds to approximating it to the firing angle output from the engine characteristics map. This knock control with the required firing angle adjustment is performed by microprocessor 3. On the basis of the available operating parameters, microprocessor 3 calculates a mapped firing angle to which an adaptive firing angle adjustment $\Delta\alpha$ is applied after knocking occurs. An adaptive engine characteristics map like that illustrated in FIG. 2 is stored in microprocessor 3. This adaptive engine characteristics map is subdivided into individual operating ranges as a function of load L and speed n. German Patent No. 40 08 170 for example contains a detailed description of this adaptive engine characteristics map.

Figure 3:
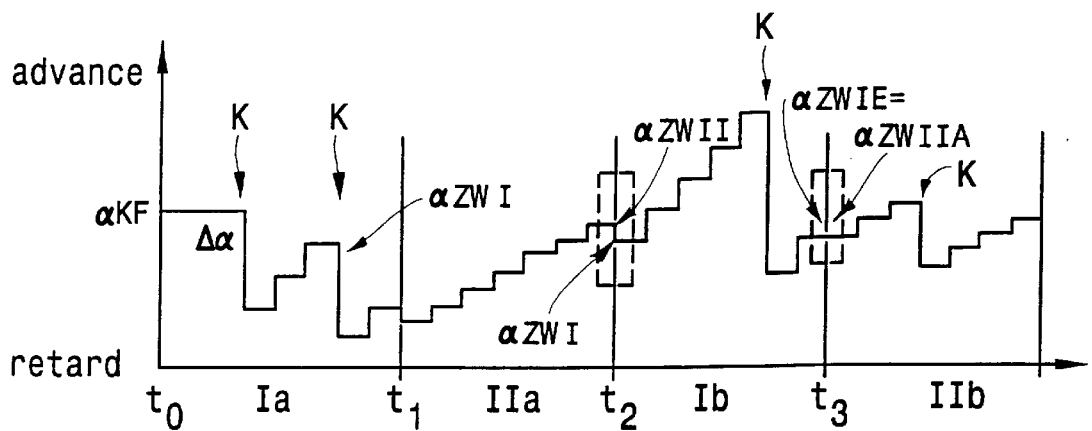
FIG. 3 illustrates the change in the firing angle on the basis of the process according to the present invention, and FIG. 4 show a diagram of the individual process steps.

The knock control process according to the present invention will now be explained with reference to FIG. 3, which illustrates the operation of the internal combustion engine in any observation period. At time t0 a combustion engine begins to operate in operating range I. The controller determines a firing angle $\alpha_{KF}$ on the basis of the current measured operating parameters using an engine characteristics map generated from speed and load. Knocking K is detected during operation of the internal combustion engine in operating range I. Then the firing angle is retarded by $\Delta\alpha$. The extent of retardation of the firing angle depends on the knocking intensity. Then the firing angle is returned by advancing it incrementally, thus approaching the mapped firing angle. This restoration of the firing angle is continued until knocking K occurs again or until reaching the mapped firing angle. In the embodiment according to FIG. 3, knocking K occurs once more during operation in operating range I, so the firing angle is again retarded. At time t1 the internal combustion engine changes operating ranges, e.g., from load operation to deceleration operation. On leaving operating range I, the last firing angle $\alpha_{ZWI}$ for this operating range is saved in a memory of microprocessor 3. It is also conceivable to save a firing angle calculated from all firing angles in this operating range, e.g., the average value, instead of saving the last firing angle.

At time t1 there is a change of operating range, i.e., leaving the range of the adaptive engine characteristics map and entering a new range. In the present case in FIG. 3, there is a change from range I to range II. This first occurrence of range II in the observation period in question in FIG. 3 is designated as IIa, to illustrate the fact that this range II occurs for the first time in the observation period illustrated here. The firing angle output at time t1 illustrates the conventional firing angle output in the related art. Thus, the firing angle value determined in the previous operation of the internal combustion engine in operating range II is output as the new starting value for range II on leaving this range II. Then in operating range IIa, the firing angle is restored to the mapped firing angle with this restoration being accomplished with increments using a smaller step height and step width.

At time t2 the internal combustion engine again changes ranges. Specifically, operation of the internal combustion engine changes from operating range IIa to operating range Ib, where b denotes that this is the second occurrence of this operating range in FIG. 3. In the process according to the present invention, a check is performed at time t2 to determine whether load dynamics also occur when the change in ranges occurs. If load dynamics occur in changing ranges, the firing angle saved for this operating range in a previous operation of the internal combustion engine (not shown here) is output as the starting value for operation in this operating range. Then this firing angle is again restored to the mapped firing angle or until knocking occurs.

At time t3 there is another change of ranges, where operation of the internal combustion engine changes from operating range Ib to operating range IIb. At time t3, a check is again performed to determine whether load dynamics ΔL occur. No load dynamics are detected at time t3, so the current firing angle on leaving operating range Ib is retained as the starting value for operating range IIb. This prevents sudden changes in firing angle with a change in operating range of the internal combustion engine.

Ultimately, the respective firing angle before knocking occurs in the various operating ranges can be determined and entered in the current engine characteristics map for determining the firing angle in such a way that the previous value entered there is overwritten. Thus the firing angle map is constantly being updated and the firing angle output is optimized for the operation of the internal combustion engine. Thus, this is a type of self-learning firing angle map that comes closer and closer to the knock limit. There are various possibilities for selecting or defining a firing angle that replaces the mapped firing angle saved in the memory. Thus, for example, the mapped firing angle stored previously can be overwritten by the last firing angle before knocking occurs as the new firing angle for this operating point or the first firing angle after knocking occurs. It is also conceivable to apply a slight correction, such as a definable firing angle displacement ZW, to the firing angle before knocking occurs and to enter this value in the engine characteristics map. Moreover, it is also possible for this correction to the mapped firing angle to be made only when the mapped firing angle saved in the memory differs from the new firing angle to be entered in the engine characteristics map by a predetermined difference DZW.

Figure 4:
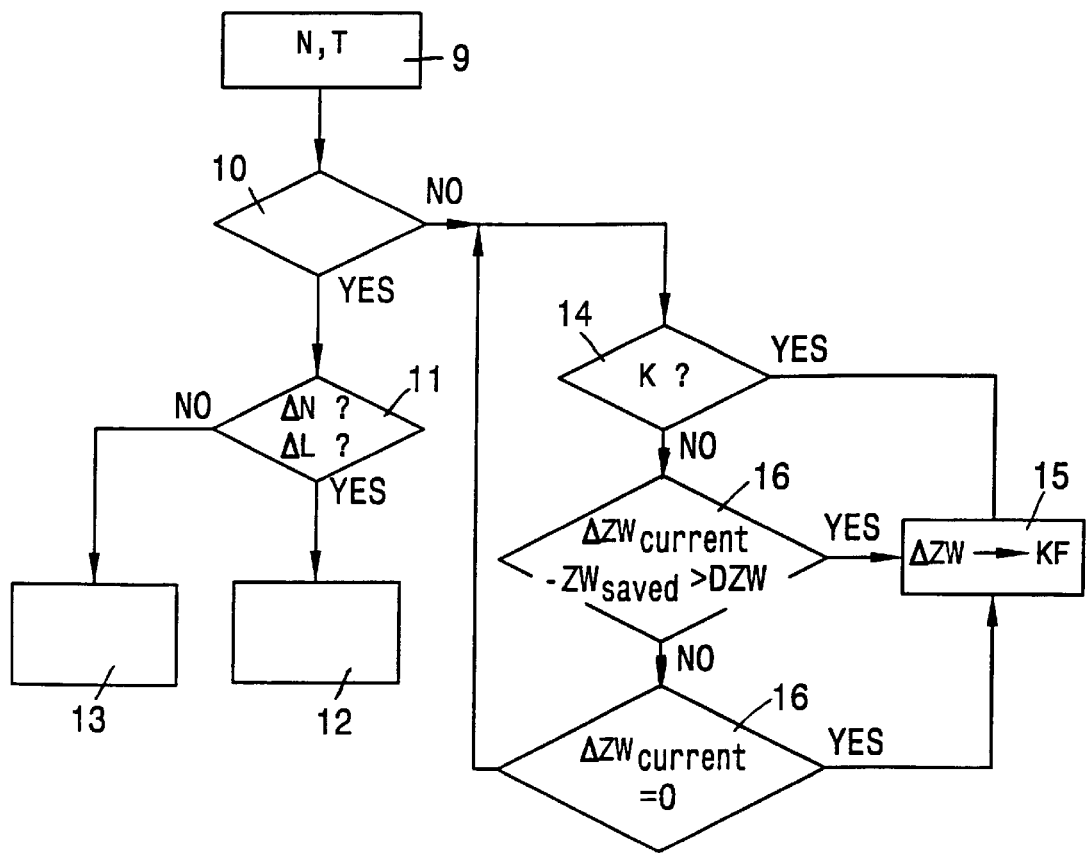

FIG. 4 shows a schematic diagram of the process according to the present invention. First, the load L and the speed N are determined in step 9, whereupon a query 10 determines whether there has been a change in ranges. If this is the case, a subsequent query 11 determines whether load and/or speed dynamics are occurring at the same time. If the answer to this question 11 is "yes," the firing angle saved for this operating range in an adaptive engine characteristics map is output as the starting firing angle in step 12 or, if the answer is "no," the firing angle of the operating range recently left is retained in step 13. If inquiry 10 concerning whether there has been a change of ranges is answered as "no," the knock control process continues in the known way, i.e., query 14 determines whether knocking K has occurred. If this is the case, knock control is performed by retarding the firing angle by a predetermined amount ΔZW in step 15, and the current retardation is saved in an adaptive characteristics map. If no knocking is found in query 14, query 16 determines whether the current firing angle change ΔZW and the stored firing angle differ by a predetermined threshold value DZW. If this is the case, the answer "yes" to this question leads to step 15, where the current firing angle change is stored in the adaptive engine characteristics map. However, if query 16 is answered in the negative, the current change in firing angle is set to zero and the mapped firing angle is output for controlling the operation of the internal combustion engine.

There are various possibilities for learning the knock limit. For example, the firing angle immediately before knocking K occurs or the firing angle immediately after knocking K occurs, i.e., after the first correction to retard the angle, can be entered in the engine characteristics map. However, it is also conceivable to shift the firing angle before knocking occurs by a predetermined value for the change in firing angle and to save this value in the engine characteristics map for the purpose of learning the knock limit.

What is claim is:

1. A process for adaptive knock control of an internal combustion engine having a plurality of operating ranges defined by operating parameters of the engine, the method comprising the steps of:

when a knocking occurs in a cylinder of the engine during operation of the engine in one of the operating ranges of the engine, retarding a firing angle for the cylinder;

when no cylinder knocking occurs, restoring the firing angle by advancing the firing angle;

saving the retarded firing angle corresponding to the one of the operating ranges of the engine in an adaptive characteristics map, the adaptive characteristics map containing the plurality of operating ranges, the retarded firing angle being saved when the engine leaves the one of the operating ranges; and outputting the saved retarded firing angle from the adaptive characteristics map when the engine returns to the one of the operating ranges and, simultaneously, at least one of load dynamics and speed dynamics occurs.

2. The process according to claim 1, further comprising the step of retaining a preceding retarded firing angle when the engine changes operating ranges and the at least one of the load dynamics and the speed dynamics is less than a predetermined value.

3. The process according to claim 1, further comprising the step of entering the firing angle before the knocking occurs into the characteristics map.

4. The process according to claim 1, further comprising the step of entering the firing angle after the knocking occurs into the characteristics map.

5. The process according to claim 1, further comprising the steps of:

applying a firing angle correction to the firing angle before the knocking occurs; and entering the corrected firing angle into the characteristics map.

6. The process according to claim 1, further comprising the step of replacing the saved retarded firing angle in the characteristics map with a new retarded firing angle only when a difference between the saved retarded firing angle and the new retarded firing angle is greater than a preselected threshold value.

* * * * *